Patented Feb. 24, 1942

2,273,822

UNITED STATES PATENT OFFICE 2,273,822

TREATMENT OF POLYSTYRENE

Ivey Allen, Jr., Bloomfield, N. J., assignor, by mesne assignments, to Union Carbide and Carbon Corporation, New York, N. Y., a corporation of New York No Drawing. Application May 18, 1937, Serial No. 143,383

5 Claims. (Cl. 260—91)

This invention relates to a polystyrene product suitable for plastic molding and to a process for its preparation.

An object of the present invention is the preparation of an improved polystyrene.

Another object of the invention is the production of a molded polystyrene possessing a lasting transparency.

A still further object of the invention is the preparation of a molded polystyrene possessing a superior mechanical strength.

Polystyrene is commonly prepared by the polymerization of styrene which is derived from ethyl benzene by dehydrogenation. As a result, much of the commercial polystyrene is a mixture in varying proportions of polystyrene, styrene, and some ethyl benzene. Such a material has been utilized to a limited extent in the preparation of wire coating compositions, lacquers and the like, but has failed signally when used in compositions intended for injection or compression molding. The cause of this failure has been due chiefly to the fact that the finished molded pieces possess low mechanical strength and that they exhibit within a few hours to a few days after molding an undesirable surface deterioration designated as "frosting." This frosted appearance is seemingly due to the development of a large number of small hair line cracks which grow in number and size as the molded piece ages, so that the molded piece which was initially transparent becomes opaque and lustreless.

The appearance of such a molded polystyrene makes it unsuitable for many purposes, particularly when used for decorative or novelty articles and the like. Moreover, the tendency towards frosting is associated with low mechanical strength which mitigates against the use of such a material wherever superior resistance to shock or impact is desired.

The present invention is, therefore, concerned with the preparation of molded objects of polystyrene which will not exhibit this frosted appearance on aging but will have a lasting transparency and superior mechanical strength.

This, it has been found, can be accomplished by producing a polystyrene which contains, at the most, not more, and preferably less, than 3% of methanol soluble constituents which may be determined as follows: A suitable portion, say about 1 part of the material to be tested, is dissolved in about 100 parts of dioxane and then added to an amount (say about 2000 parts) of methanol in considerable excess of that required to completely precipitate the polystyrene. The amount of polystyrene precipitated in this test should constitute at least 97% of the original material, in order to produce a molded material of lasting transparency without apparent frosting.

Moreover, it has been found that the polystyrene should possess, in addition to a high percentage of methanol insoluble material, a molecular weight in excess of 40,000 as determined by the Staudinger viscosity method, in order that it may have when molded a mechanical strength sufficient to be commercially practical, that is, the molded material should have an Izod impact strength of at least 2½ foot pounds per inch square.

Broadly stated, therefore, the method of the invention comprises polymerizing styrene under such conditions as will produce a polystyrene having a molecular weight in excess of 40,000 and treating it to remove substantially all methanol soluble material, until not more than 3% of such soluble material remains to produce a polystyrene non-frosting when molded.

The production of a polystyrene of a molecular weight in excess of 40,000 has been found to require the use of styrene, preferably in excess of 90% styrene content and a polymerization temperature not greatly in excess of 110° C. Higher polymerization temperatures have been found to produce low molecular weight polystyrenes which are deficient in mechanical strength, particularly in resistance to impact. Thus a polystyrene containing about 98% methanol insoluble material and a molecular weight of about 32,000 possesses an impact strength (Izod) of only 1.04 foot pounds per inch square, whereas a comparable polystyrene of about 62,000 molecular weight possessed an impact strength of 2.81 foot pounds per inch square.

In addition to producing a polystyrene which possesses the requisite molecular weight it has been found necessary to treat it to reduce the amount of methyl alcohol soluble material, for example, by subjecting the polystyrene to a rolling or kneading operation which is advantageously done on differential rolls heated to about 125–130° C., until the methanol soluble constituents are reduced to less than 3%. The time of such treatment should not be prolonged since temperatures in excess of 110° C. tend to produce a polystyrene of low molecular weight. Consequently, the preferred procedure is to first prepare a polystyrene at temperatures below 110° C., possessing a molecular weight in excess of that desired and then to subject such a material to mechanical working at temperatures somewhat in excess of 110° C. for only the short period of time required to reduce the amount of alcohol soluble constituents. Such a period of time does not in general exceed 15 minutes.

The following example illustrates a preferred method of carrying out the invention:

About 700 pounds of styrene, containing at least 90% styrene, are heated at 110° under agitation in a jacketed still provided with a reflux condenser for about 14 hours or until about 60% of the styrene is converted to polystyrene. The extent of conversion can be determined by withdrawing a sample and heating it on a hot plate at 250° C. until the volatile portion has been removed. The residue, non-volatile at 250° C., should constitute about 60% of the original material. The material is then discharged into cans of about sixty pounds capacity and the polymerization allowed to continue under its own heat of reaction which does not in general cause the temperature to exceed 110° C. After the temperature has dropped to 80° C. or lower, the cans are placed in an oil bath and further heated at 110° C. until approximately 90–95% of the styrene has been converted to polystyrene, having a molecular weight of about 80,000–85,000. The material is removed from the container and rolled on differential rolls at 125–130° C. until a polystyrene is obtained which comprises at least 97% polystyrene as determined by precipitation by methanol from a dioxane solution and a molecular weight in excess of 40,000 as determined by the Staudinger viscosity method, but preferably in excess of 50,000, for example about 55,000–60,000.

This material when molded at 250° F. and 2000 pounds pressure per square inch gave a hard, colorless, clear, transparent material which did not exhibit any apparent frosting even after six months to a year from the time it was originally molded. The impact strength of the molded piece exceeded 2.5 foot pounds per inch square. On the other hand, polystyrene materials which were not processed until they comprised at least 97% polystyrene exhibited marked frosting when molded under comparable conditions. Thus, a material comprising 89.9% polystyrene as determined by precipitation by methanol from a dioxane solution developed a spotty haze in less than one day after molding, while another material comprising 94% polystyrene showed general frosting within one week after molding, and a material comprising 95.9% polystyrene showed a faint sign of haze after seventeen days and a more pronounced haze at the end of twenty-four days after molding.

The polystyrenes prepared by the method of the invention are suitable for all types of injections or compression molding. Plasticizers are not required, although they may be added if desired. The resulting molded pieces will be clear, transparent and water white. Dyes or pigments may be added if desired. The molded material is hard and possesses good resistance to shock. It has been used successfully for molding toiletries, containers, decorative novelties, closures, and similar articles.

I claim:

1. A method of making polystyrene material suitable for molding which comprises polymerizing styrene to a polystyrene having a molecular weight exceeding 40,000 and treating the polymerized styrene by mechanical working to reduce methanol soluble components to less than 3% of the material.

2. A method of making polystyrene material suitable for molding which comprises polymerizing styrene to a polystyrene having a molecular weight exceeding 40,000 and treating the polymerized styrene by mechanical working at a temperature of about 125–130° C. to reduce methanol soluble components to less than 3% of the material.

3. A method of making polystyrene material suitable for molding which comprises polymerizing styrene having a purity of at least 90% at a temperature of about 110° C. to a polystyrene having a molecular weight substantially in excess of 50,000 and mechanically working the polymerized styrene at a temperature above 110° for a time long enough to reduce methanol soluble components to less than 3% of the material but not long enough to reduce the molecular weight substantially below 50,000.

4. A method of making polystyrene material suitable for molding which comprises polymerizing styrene having a purity of at least 90% at a temperature of about 110° C. to a polystyrene having a molecular weight substantially in excess of 50,000 and mechanically working the polymerized styrene at a temperature above the temperature of polymerization for a time long enough to reduce methanol-soluble components to less than 3% of the material but not long enough to reduce the molecular weight substantially below 50,000.

5. A method of making polystyrene material suitable for molding which comprises polymerizing styrene having a purity of at least 90% at a temperature of about 110° C. to a polystyrene having a molecular weight substantially in excess of 50,000 and mechanically working the polymerized styrene at a temperature of about 125°–130° C. for a time long enough to reduce methanol-soluble components to less than 3% of the material but not long enough to reduce the molecular weight substantially below 50,000.

IVEY ALLEN, Jr.